(12) United States Patent
Chen

(10) Patent No.: US 9,025,088 B2
(45) Date of Patent: May 5, 2015

(54) SECTIONAL DYNAMIC-DRIVING BACKLIGHT MODULE AND HEAD-UP DISPLAY DEVICE THEREOF

(71) Applicant: National Tsing Hua University, Hsinchu (TW)

(72) Inventor: Cheng-Huan Chen, Hsinchu (TW)

(73) Assignee: National Tsing Hua University (TW)

( * ) Notice: Subject to any disclaimer, the term of this patent is extended or adjusted under 35 U.S.C. 154(b) by 145 days.

(21) Appl. No.: 13/929,294

(22) Filed: Jun. 27, 2013

(65) Prior Publication Data
US 2014/0063359 A1 Mar. 6, 2014

(30) Foreign Application Priority Data

Aug. 31, 2012 (TW) .............................. 101131770 A

(51) Int. Cl.
*G02B 27/01* (2006.01)
*G02F 1/13* (2006.01)
*G02B 3/00* (2006.01)

(52) U.S. Cl.
CPC .......... *G02B 27/0101* (2013.01); *G02F 1/1313* (2013.01); *G02B 3/0006* (2013.01); *G02B 2027/0118* (2013.01); *G02B 2027/0187* (2013.01)

(58) Field of Classification Search
CPC ........................ G02B 27/0101; G02B 27/0172
USPC ............................................................ 349/11
See application file for complete search history.

(56) References Cited

U.S. PATENT DOCUMENTS

| 2011/0075434 A1* | 3/2011 | Kurokawa ..................... 362/459 |
| 2012/0099032 A1* | 4/2012 | Ishikawa ........................ 349/11 |

* cited by examiner

*Primary Examiner* — Thanh-Nhan P Nguyen

(57) ABSTRACT

The present invention relates to a sectional dynamic-driving backlight module and a head-up display device thereof. The sectional dynamic-driving backlight module comprises an optical-directional lens unit and an optical-homogenizing unit. The optical-directional lens unit is provided for converging the light beams emitted by the light source assemblies in the backlight module into light beams with a smaller divergent angle, and the optical-homogenizing unit is used for further homogenizing the light beams, so as to make all display regions of the LCD show a uniform illumination. Therefore, all images showed on an eyebox of the driver are distinct. Besides, each of the light source assemblies consist a red-light LED chip, a green-light LED chip, a blue-light LED chip, and a white-light LED chip, and these LED chips may be controlled by a controlling PCB for lighting respectively or simultaneously, so as to achieve a sectional dynamic display.

11 Claims, 8 Drawing Sheets

SECTIONAL DYNAMIC-DRIVING BACKLIGHT MODULE AND HEAD-UP DISPLAY DEVICE THEREOF

BACKGROUND OF THE INVENTION

1. Field of the Invention

The present invention relates to a backlight display module, and more particularly to a sectional dynamic-driving backlight module and a head-up display device thereof.

2. Description of the Prior Art

Recently, assisting devices for increasing vehicle reliability and driver visibility are getting more and more popular base on the driving safety and environment concerns. For instance, global positioning system (GPS) and head-up display (HUD) are commonly applied in automobiles for driving-assist purpose. The HUD is able to project the imaged to be displayed onto a windscreen of the automobile for providing some road-related information to the driver, such as dashboard information and navigation information. By the assist of the HUD, the driver can focus his sight on the front without looking down at the dashboard or turning to staring at the navigation device; and that can prevent driver's attention from being dispersed.

Please refer to FIG. 1, which illustrates a schematic application diagram of a conventional head-up device. As shown in FIG. 1, the conventional head-up device 82' is install in a vehicle 80', and includes a backlight module 821' and a non-self-emitting luminescence display 822'. The backlight module 821' (such as a light-emitting diode (LED) array) is configured for emitting light and providing a backlight to the non-self-emitting luminescence display 822' (such as a liquid crystal display (LCD)); therefore, by the LCD, a display image would be projected to an eyebox 84' of the driver on the windscreen of the vehicle 80'.

Because the backlight module 821' of the head-up device 82' emits light divergently, the driver may see the display image on the eyebox 84' form various visible angle; however, the divergent light causes the shortcoming of low brightness and low light intensity on the display image. For above reasons, the number of the light source must be increased in order to enhance the brightness and intensity of the display image projected by the head-up device 82'. Although the increase of the light source number would enhance the brightness and intensity of the display image, that would also increase the total weight of the head-up device 82', the usage of electricity and the load of heat-dissipation requirement.

Thus, according to the backlight module 821' and the non-self-emitting luminescence display 822' of the head-up device 82' have many shortcomings and drawbacks, head-up device manufacturers propose a new backlight display module. Please refer to FIG. 2, there is shown a framework view of the new backlight display module. As shown in FIG. 2, the backlight display module 1' consists of a LCD 100', a plurality of light sources 110' and a micro-optical array group 120'. The light sources 110' (such as LED chips) are disposed at one side of the LCD 100' for emitting light to the LCD 100'.

The micro-optical array group 120' is disposed between the LCD 100' and the light sources 110' and consisted of a substrate 121', a period-variable 2D free-form surface lens array 122' and a period-variable 2D free-form cone array 123'. The period-variable 2D free-form surface lens array 122' is disposed on one surface of the substrate 121' and faces to the light sources 110', used for converging the divergence angle of the light emitted from the light source 110'. Opposite to the period-variable 2D free-form surface lens array 122', the period-variable 2D free-form cone array 123' is disposed on the other surface of the substrate 121' and faces to the LCD 100', used for directing and focusing the light to an eyebox 130' of a driver. As the solid line path in the FIG. 2 shows, after the light sources 110' emits the light into the micro-optical array group 120', the light path would be adjusted and deflected by the micro-optical array group 120', and then be concentrated within the eyebox 130'. Moreover, the dotted line path 150 in FIG. 2 further reveals that the light of each of the pixels on the LCD 100' distribute to and form a cone shape, that means each of the pixels on the LCD 100' can merely be seen by the driver from the eyebox 130'.

Therefore, through above descriptions, it is able to know that the shortcoming of the head-up device 82' of FIG. 1 can be solved through replacing the backlight module 821' and the non-self-emitting luminescence display 822' by the backlight display module 1' of FIG. 2. However, it still can find that the backlight display module 1' includes some shortcomings and drawbacks of:

(1) Although the micro-optical array group 120' of the backlight display module 1' is able to converge the divergence angle of the light emitted from the light source 110' and direct the light to the driver's eyebox 130', the light does not be homogenized; so that, the non-homogenized light cannot provide a uniform backlight to the LCD 100', so as to produce an optical dark area and an optical bright area on the LCD 100'; Predictably, it is difficult for the driver to clearly see and effectively distinguish the images or texts displayed on the optical bright area.

(2) The backlight module 1' cannot project a full-color image to the eyebox 130' because each of the light sources 110' are a monochrome LED chip.

(3) Inheriting to above point 2, for making the backlight display module 1' able to show the full-color display, a color filter must be applied into the backlight display module 1' and the monochrome LED chips must be the white LED chips. However, the application of the color filter would increase the manufacturing cost of the backlight display module 1'; besides, the white LED chips kept on a continuation-emitting state would also result in high power consumption, and cause the backlight display module 1' needs to be recurrently charged.

Accordingly, in view of the conventional backlight display module and head-up device still have the drawback of cannot to be incinerated by the incinerator, the inventor of the present application has made great efforts to make inventive research thereon and eventually provided a sectional dynamic-driving backlight module and a head-up display device thereof.

SUMMARY OF THE INVENTION

The first objective of the present invention is to provide a sectional dynamic-driving backlight module, which is able to provide a uniform backlight to a LCD because of having a directional lens unit for converging the divergence angle of the light emitted from the light source sets and a light homogenizing unit for homogenizing the light directed and concentrated by the directional lens unit, so as to facilitate the brightness of all display regions on the display be uniform.

The second objective of the present invention is to provide a sectional dynamic-driving backlight module, which comprises a plurality of light source sets, and each of the light source sets have a red-light LED chip, a green-light LED chip, a blue-light LED chip, and a white-light LED chip; thus, when an image to be displayed is showed on the display unit, the controlling board would control the light source sets according to the colors of different sections of the image to be displayed, and then the light source sets would make the red-light LED chip, the green-light LED chip, the blue-light LED chip, or the white-light LED chip emit light correspondent with the controlling from the controlling board, so as to achieve a sectional dynamic display and make the backlight module be energy-saving.

Accordingly, to achieve the first and second objectives of the present invention, the inventor of the present invention provides a sectional dynamic-driving backlight module, comprising:

a controlling board;

a plurality of light source sets, being disposed on the controlling board, wherein each of the light source sets have a red-light LED chip, a green-light LED chip, a blue-light LED chip, and a white-light LED chip;

a directional lens unit, being disposed over the light source sets, used for deflecting the light emitted by the light source sets, so as to converge the angle of a divergence angle of the emitted light; therefore, the light deflected by the directional lens unit would be directed and concentrated within an eyebox of a driver;

a light homogenizing unit, being disposed over the directional lens unit, used for homogenizing the light directed and concentrated by the directional lens unit; and a display unit for showing an image to be displayed;

wherein when the image to be displayed is showed on the display unit, the controlling board would control the light source sets according to the colors of different sections of the image to be displayed, therefore the light source sets make the red-light LED chip, the green-light LED chip, the blue-light LED chip, or the white-light LED chip emit light correspondent with the controlling from the controlling board.

The third objective of the present invention is to provide a head-up device integrated with the sectional dynamic-driving backlight module, in which, the sectional dynamic-driving backlight module of the head-up device is able to provide a uniform backlight to a LCD because of having a directional lens unit for converging the divergence angle of the light emitted from the light source sets and a light homogenizing unit for homogenizing the light directed and concentrated by the directional lens unit, so as to facilitate the brightness of all display regions on the display be uniform; therefore, the driver can see the images or texts shown on the display region of the display easily and clearly.

The fourth objective of the present invention is to provide a head-up device integrated with the sectional dynamic-driving backlight module, in which, the sectional dynamic-driving backlight module of the head-up device comprises a plurality of light source sets, and each of the light source sets have a red-light LED chip, a green-light LED chip, a blue-light LED chip, and a white-light LED chip; thus, when an image to be displayed is showed on the display unit, the controlling board would control the light source sets according to the colors of different sections of the image to be displayed, and then the light source sets would make the red-light LED chip, the green-light LED chip, the blue-light LED chip, or the white-light LED chip emit light correspondent with the controlling from the controlling board, so as to achieve a sectional dynamic display and make the head-up device be energy-saving.

The fifth objective of the present invention is to provide a head-up device integrated with the sectional dynamic-driving backlight module, in which, an external electronic device, for example, a smart phone, can be connected to the head-up device, and then the electronic device is able to input a display signal to the head-up device; therefore the related image of the display signal would be projected to the eyebox of the driver.

So that, in order to achieve the third, fourth and fifth objectives of the present invention, the inventor of the present invention provides a head-up device, comprising:

a housing, at least having a display opening; and a sectional dynamic-driving backlight module, being disposed in the housing and comprising: a controlling board; a plurality of light source sets, being disposed on the controlling board, wherein each of the light source sets have a red-light LED chip, a green-light LED chip, a blue-light LED chip, and a white-light LED chip; a directional lens unit, being disposed over the light source sets, used for deflecting the light emitted by the light source sets, so as to converge the angle of a divergence angle of the emitted light; therefore, the light deflected by the directional lens unit would be directed and concentrated within an eyebox of a driver; a light homogenizing unit, being disposed over the directional lens unit, used for homogenizing the light directed and concentrated by the directional lens unit; and a display unit for showing an image to be displayed; wherein when the image to be displayed is showed on the display unit, the controlling board controlling the light source sets according to colors of different sections of the image to be displayed, therefore the light source sets would make the red-light LED chip, the green-light LED chip, the blue-light LED chip, or the white-light LED chip emit light by the controlling from the controlling board.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe a sectional dynamic-driving backlight module and a head-up display device thereof, related embodiments of the present invention will be described in detail with reference to the attached drawings hereinafter.

Figure 1:
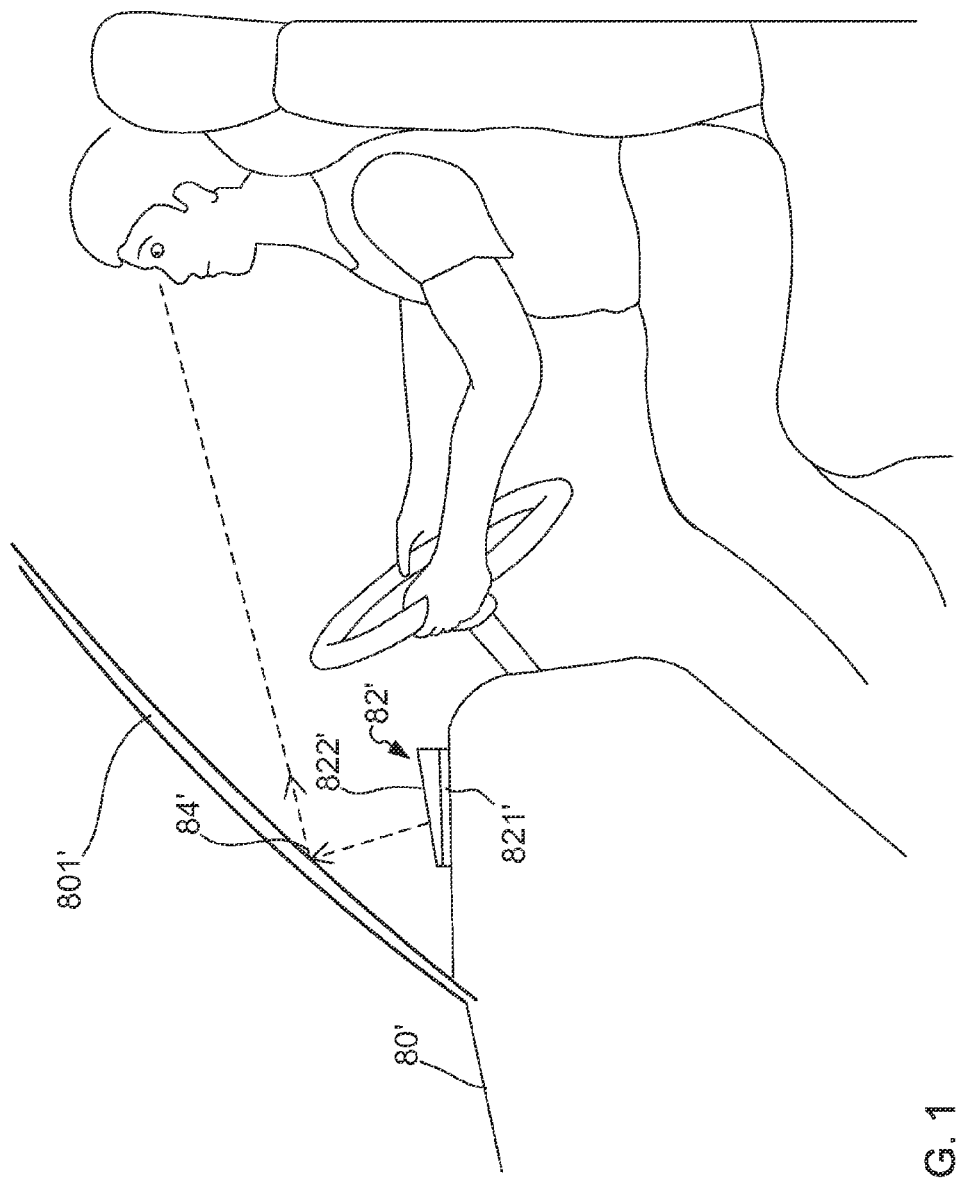
FIG. 1 is a schematic application diagram of a conventional head-up device.
Figure 2:
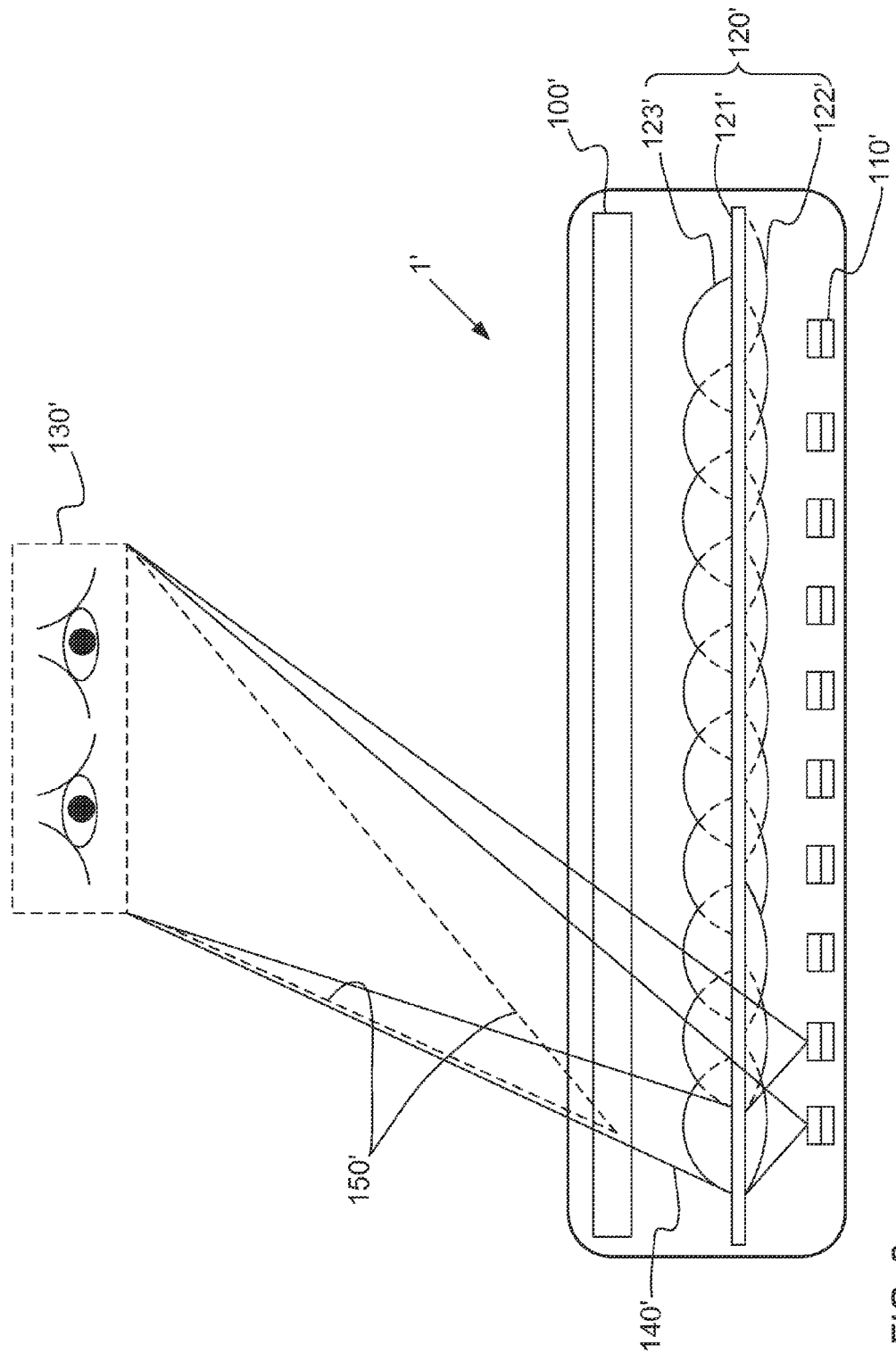
FIG. 2 is a framework view of the new backlight display module.
Figure 3:
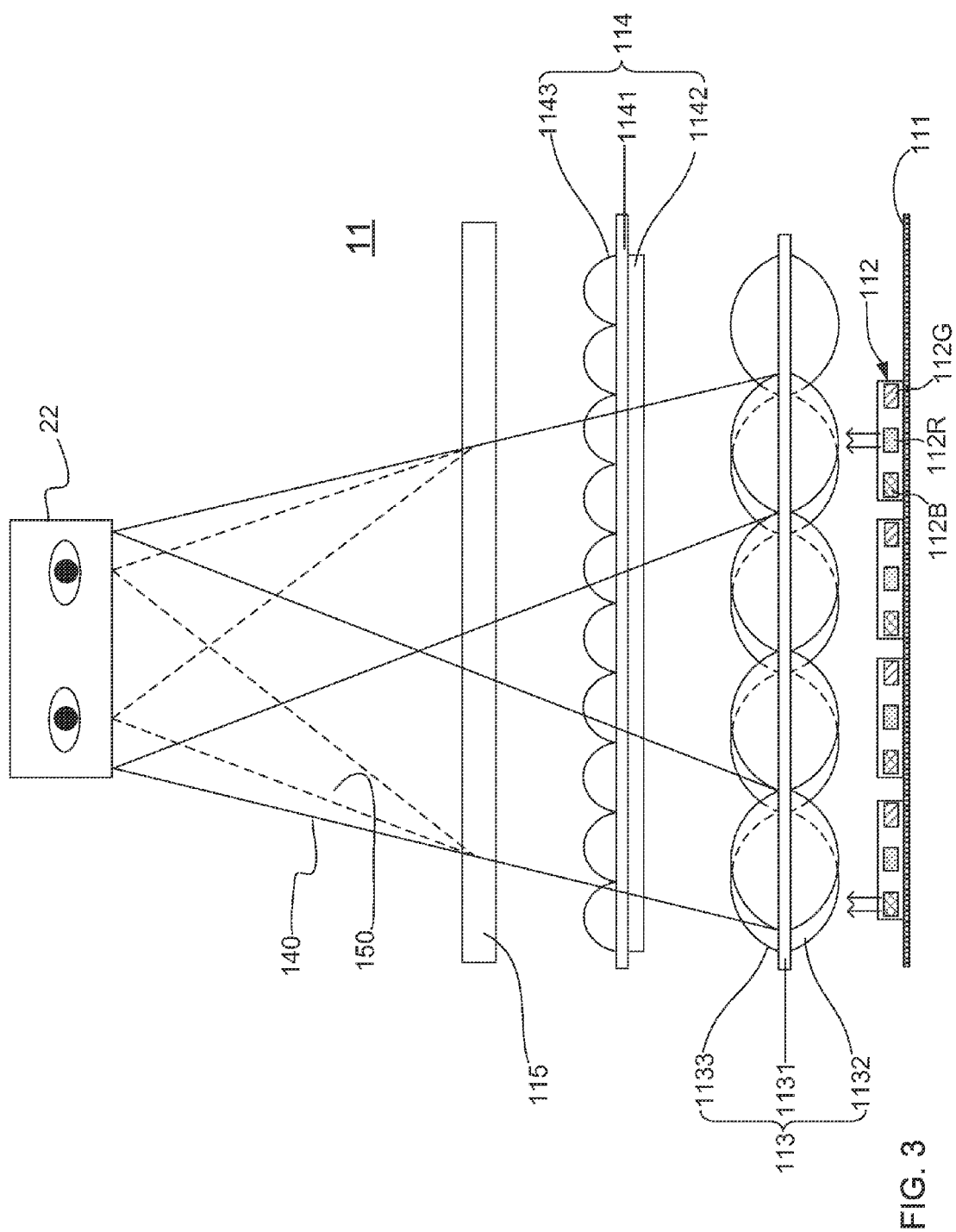
FIG. 3 is a framework diagram of a sectional dynamic-driving backlight module according to the present invention.
Figure 4:
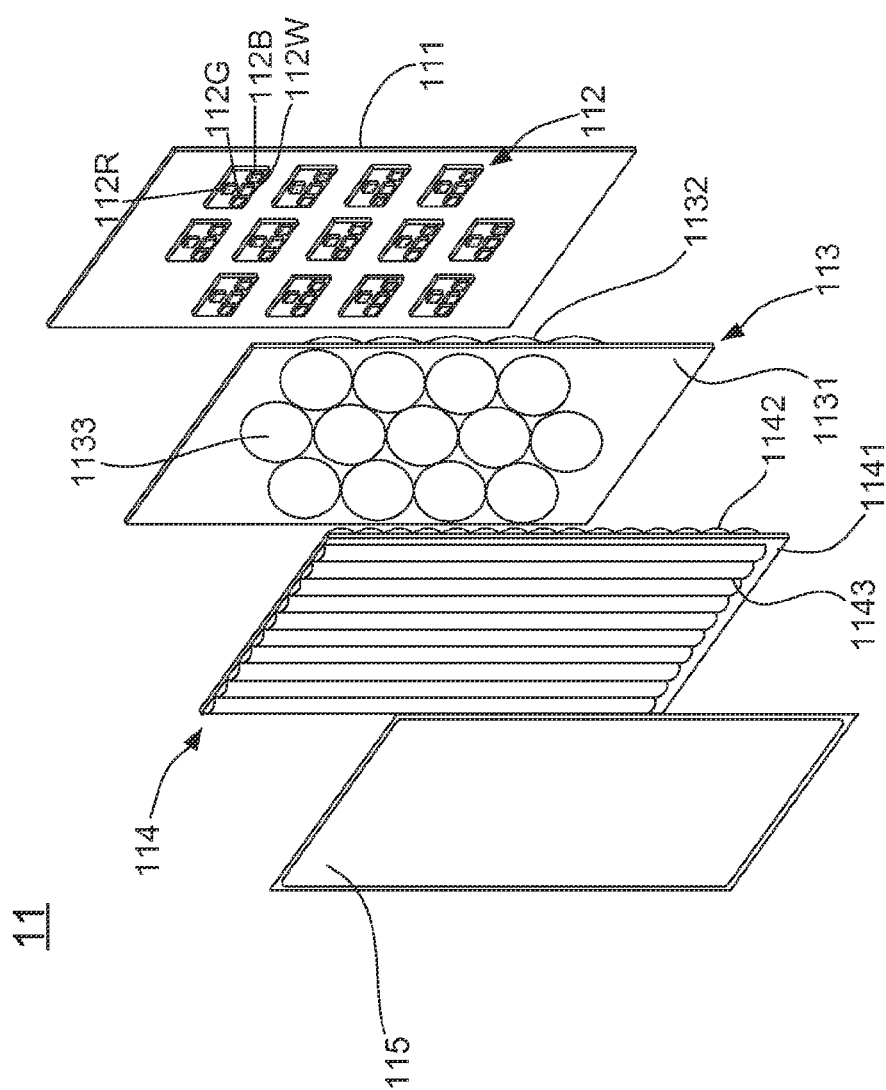
FIG. 4 is a stereo exploded view of the sectional dynamic-driving backlight module according to the present invention.

Please refer to FIG. 3 and FIG. 4, there are shown a framework diagram and a stereo exploded view of a sectional dynamic-driving backlight module according to the present invention. As shown in FIG. 3 and FIG. 4, the sectional dynamic-driving backlight module 11 consists of a controlling board 111, a plurality of light source sets 112, a directional lens unit 113, a light homogenizing unit 114, and a display unit 115.

In which, the light source sets 112 is disposed on the controlling board 111, and each of the light source sets 112 have a red-light LED chip 112R, a green-light LED chip 112G, a blue-light LED chip 112B, and a white-light LED chip 112W.

In the present invention, the directional lens unit 113 is disposed over the light source sets 112, and consists of a first substrate 1131, a first period-variable and curvature-variable lens array 1132 and a second period-variable and curvature-variable lens array 1133. The first period-variable and curvature-variable lens array 1132 is formed on one surface of the first substrate 1131 for deflecting the light emitted by the light source sets, so as to converge the angle of the divergence angle of the emitted light. The second period-variable and curvature-variable lens array 1133 is formed on the other surface of the first substrate 1131 opposite to the first period-variable and curvature-variable lens array 1132, and used for further directing and focusing the light deflected by the first period-variable and curvature-variable lens array 1132 to an eyebox 22 of a driver.

The light homogenizing unit 114 is disposed over the directional lens unit 113 used for homogenizing the light directed and concentrated by the directional lens unit 113. The light homogenizing unit 114 consists of a second substrate 1141, a first cylindrical lens array 1142 and a second cylindrical lens array 1143, wherein the first cylindrical lens array 1142 is formed on one surface of the second substrate 1141, and the second cylindrical lens array 1143 is formed on the other surface of the second substrate 1141 opposite to the first cylindrical lens array 1142. Moreover, the second cylindrical lens array 1143 is orthogonal to the first cylindrical lens array 1142.

Herein, it needs to be further explained is that, although the light homogenizing unit 114 shown in FIG. 3 and FIG. 4 are constituted by two cylindrical lens arrays (1142 and 1143) orthogonal to each other, that is not a limited embodiment for the light homogenizing unit 114. In other exemplary embodiments, the light homogenizing unit 114 can be a fly-lens array provided on a substrate. Besides, the light homogenizing unit 114 can also be consisted of a second substrate, a first period-variable and curvature-variable cylindrical lens array, and a second period-variable and curvature-variable cylindrical lens array orthogonal to the first period-variable and curvature-variable cylindrical lens array. In which, the first period-variable and curvature-variable cylindrical lens array is formed on one surface of the second substrate, and second period-variable and curvature-variable cylindrical lens array is formed on the other surface of the first substrate opposite to the first period-variable and curvature-variable cylindrical lens array.

Referring to FIG. 3 and FIG. 4 again, the display unit 115 can be a liquid crystal display (LCD) or any one non-self-emitting luminescence display, and which is used for showing an image to be displayed. In the sectional dynamic-driving backlight module 11 of the present invention, particularly, when the image to be displayed is showed on the display unit 115, the controlling board 111 would control the light source sets 112 according to the colors of different sections of the image to be displayed, therefore the light source sets 112 make the red-light LED chip 112R, the green-light LED chip 112G, the blue-light LED chip 112B, or the white-light LED chip 112W emit light correspondent with the controlling from the controlling board 111, so as to achieve a sectional dynamic display. The dotted line path 150 in FIG. 3 reveals that the light of each of the pixels on the display unit 115 distribute to and form a cone shape, that means each of the pixels on the display unit 115 can merely be seen by the driver from the eyebox 22.

Thus, through above descriptions, the framework and related constituting elements of the sectional dynamic-driving backlight module 11 of the present invention have been introduced completely and clearly; in summary, the sectional dynamic-driving backlight module 11 of the present invention includes the advantages of:

1. Comparing to the conventional backlight display module introduced in above-mentioned Description of the Prior Art, the sectional dynamic-driving backlight module 11 is able to provide a uniform backlight to a LCD because of having a directional lens unit 113 for converging the divergence angle of the light emitted from the light source sets 112 and a light homogenizing unit for homogenizing the light directed and concentrated by the directional lens unit 113, so as to facilitate the brightness of all display regions on the display be uniform.
2. Moreover, differing from the conventional backlight display module, each of the light source sets 112 applied in the sectional dynamic-driving backlight module 11 have a red-light LED chip 112R, a green-light LED chip 112G, a blue-light LED chip 112B, and a white-light LED chip 112W; thus, when the image to be displayed is showed on the display unit 115, the controlling board 111 would control the light source sets 112 according to the colors of different sections of the image to be displayed, therefore the light source sets 112 make the red-light LED chip 112R, the green-light LED chip 112G, the blue-light LED chip 112B, or the white-light LED chip 112W emit light correspondent with the controlling from the controlling board 111, so as to achieve a sectional dynamic display and make the backlight module be energy-saving.

Figure 5:
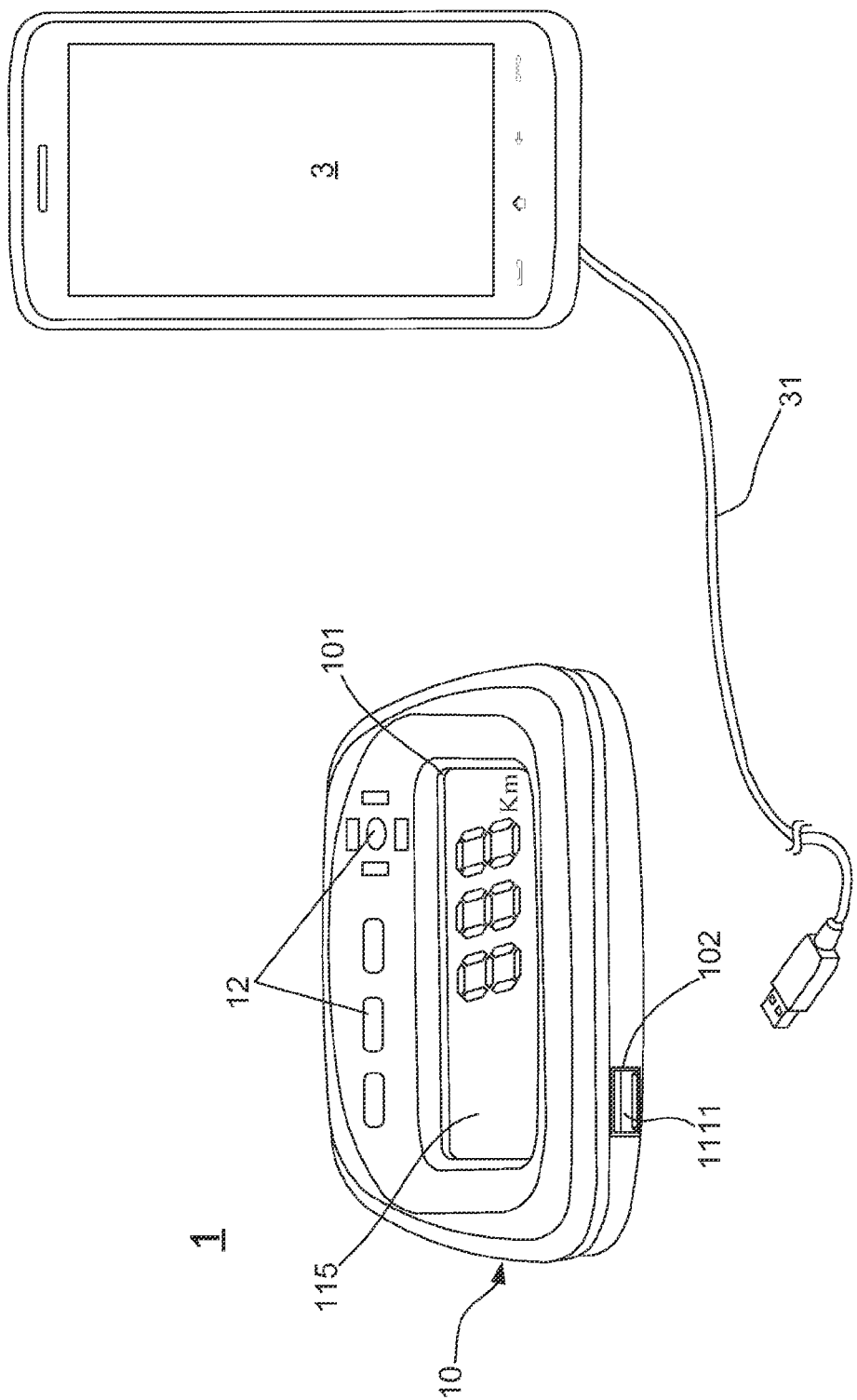
FIG. 5 is a stereo view of a head-up device integrated with the sectional dynamic-driving backlight module according to the present invention.

Next, a head-up device integrated with above-mentioned sectional dynamic-driving backlight module will be introduced in following paragraphs. Referring to FIG. 3 and FIG. 4 again, and please simultaneously refer to FIG. 5, which illustrates a stereo view of the head-up device integrated with the sectional dynamic-driving backlight module according to the present invention. As shown in FIG. 5, the head-up device 1 consists of a housing 10, a sectional dynamic-driving backlight module 11 and an operation interface 12. In which, because the framework and related constituting elements of the sectional dynamic-driving backlight module 11 have been introduced completely and clearly in above mention, that will not be repeatedly introduced hereinafter.

In the head-up device 1, the display unit 115 is exposed out of the housing 10 via a display opening 101 of the housing 10. In addition, the controlling board 111 at least has an input connector 1111, and the input connector 1111 is exposed out of the housing 10 via a connector opening 102 of the housing 10; thus, an external electronic device 3 can be connected to the input connector 1111 through a connector cable 31, and then the electronic device 3 is able to input a display signal to the controlling board 111 and the display unit 115. Moreover, the operation interface 12 of the head-up device 1 is electrically connected to the controlling board 111, used for providing the driver the function of adjusting the projection position of the image to be displayed.

Figure 6:
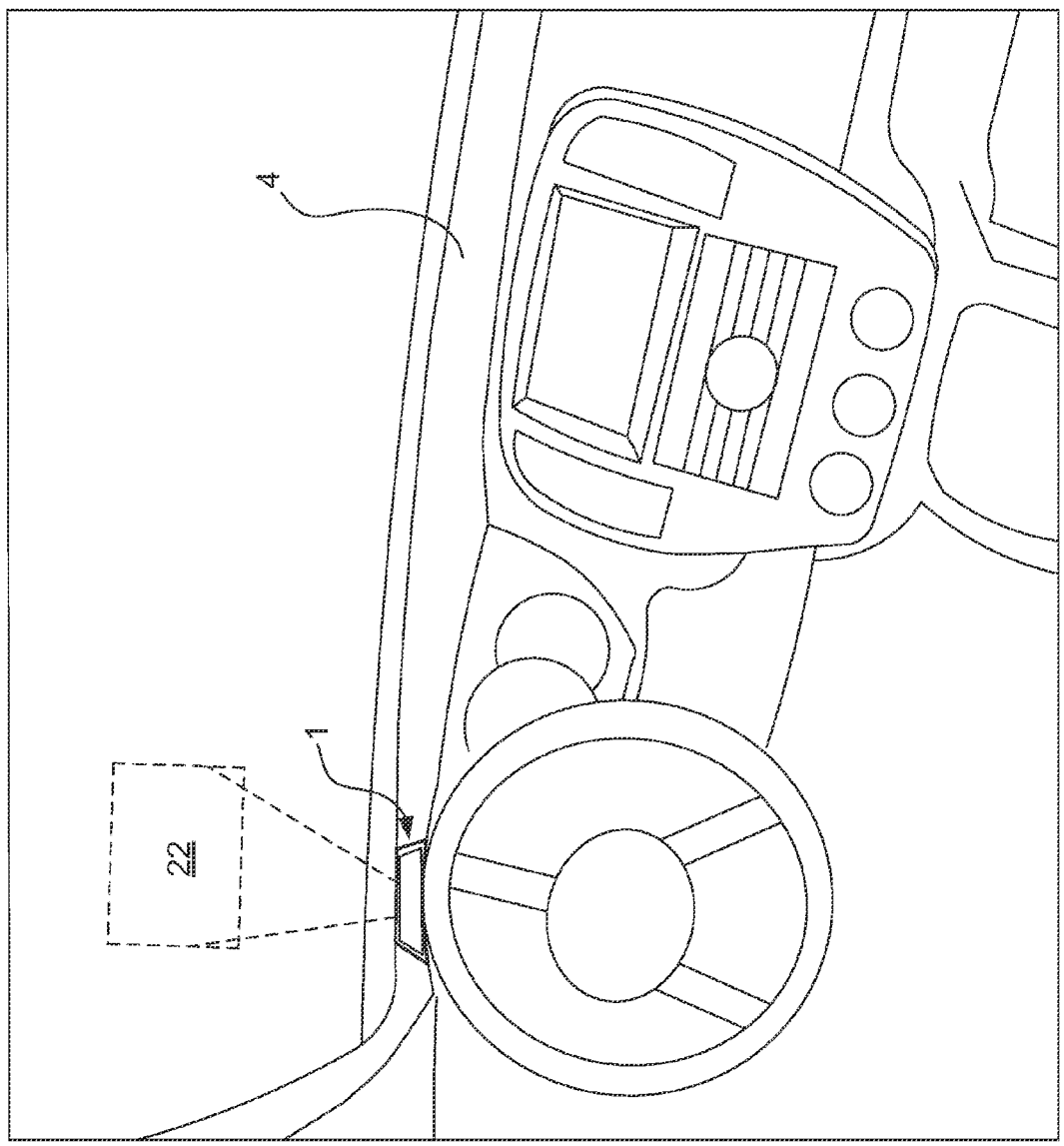
FIG. 6 is a schematic operation diagram of the head-up device.
Figure 7:
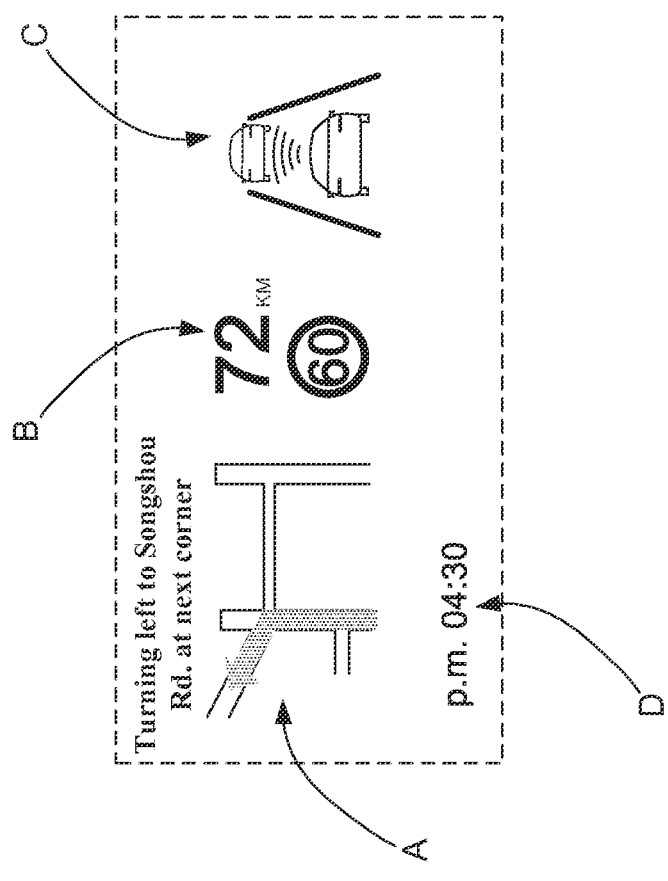
FIG. 7 is a display image view of an eyebox of a driver.

Continuously, please refer to FIG. 6 and FIG. 7, which respectively illustrate a schematic operation diagram of the head-up device and a display image view of the eyebox. In FIG. 6, the head-up device 1 is installed in a vehicle 4, and the eyebox 22 is formed on a windscreen of the vehicle 4 for receiving the image to be displayed projected by the display unit 115. As shown in FIG. 7, display regions B, C and D are configured for showing a numerical vehicle speed, a numerical distance between vehicles and a numerical current time, respectively. Moreover, in the present invention, the head-up device 1 is able to be connected with the electronic device 3, for example, being connected with a smart phone, so that the smart phone can input a display signal into the head-up device 1, and then the related image of the display signal would be shown on display region A of FIG. 7.

Furthermore, the technology feature and related efficacy of the head-up display device 1 integrated with the sectional dynamic-driving backlight module 11. When the head-up display device 1 is not connected with the electronic device 3, the controlling board 111 shown in FIG. 3 and FIG. 4 would control the light source set 112 of the display region A, so as to halt the light source set 112 of the display region A from emitting light. Besides, when the driver turn off the vehicle distance warning function of the head-up device 1 through the operation interface 12 shown in FIG. 5, the controlling board 111 would control the light source set 112 of the display region C, such that the light source set 112 of the display region C is stopped emitting light. Therefore, by above descriptions, it is able to know that the head-up device can also achieve the sectional dynamic display by way of the controlling of the sectional dynamic-driving backlight module 11.

In addition, in some exemplary embodiment of the head-up device 1, a full-color navigation map would be displayed on display region A when the driver connects a smart phone to the head-up device 1 and activates the navigation function of the smart phone; meanwhile, the controlling board 111 controls the light source set 112 of the display region A for making the red-light LED chip 112R, the green-light LED chip 112G, the blue-light LED chip 112B, and the white-light LED chip 112W continuously emit light by a time sequential way. Therefore, the full-color navigation map can be displayed on display region A without using any color filters.

In addition, the sectional dynamic display of the head-up device can further be divided into a daytime display mode and a night display mode. When the daytime display mode is executed, the controlling board 111 controls the light source sets 112, so as to make the red-light LED chips 112R, the green-light LED chips 112G, the blue-light LED chips 112B, and the white-light LED chips 112W emit light by high brightness. On the contrary, When the night display mode is executed, the controlling board 111 controls the light source sets 112, so as to make the red-light LED chips 112R, the green-light LED chips 112G, the blue-light LED chips 112B, and the white-light LED chips 112W emit light by low brightness. Therefore, the head-up device 1 becomes more energy-saving through the sectional dynamic display of the daytime display mode and night display mode.

Figure 8:
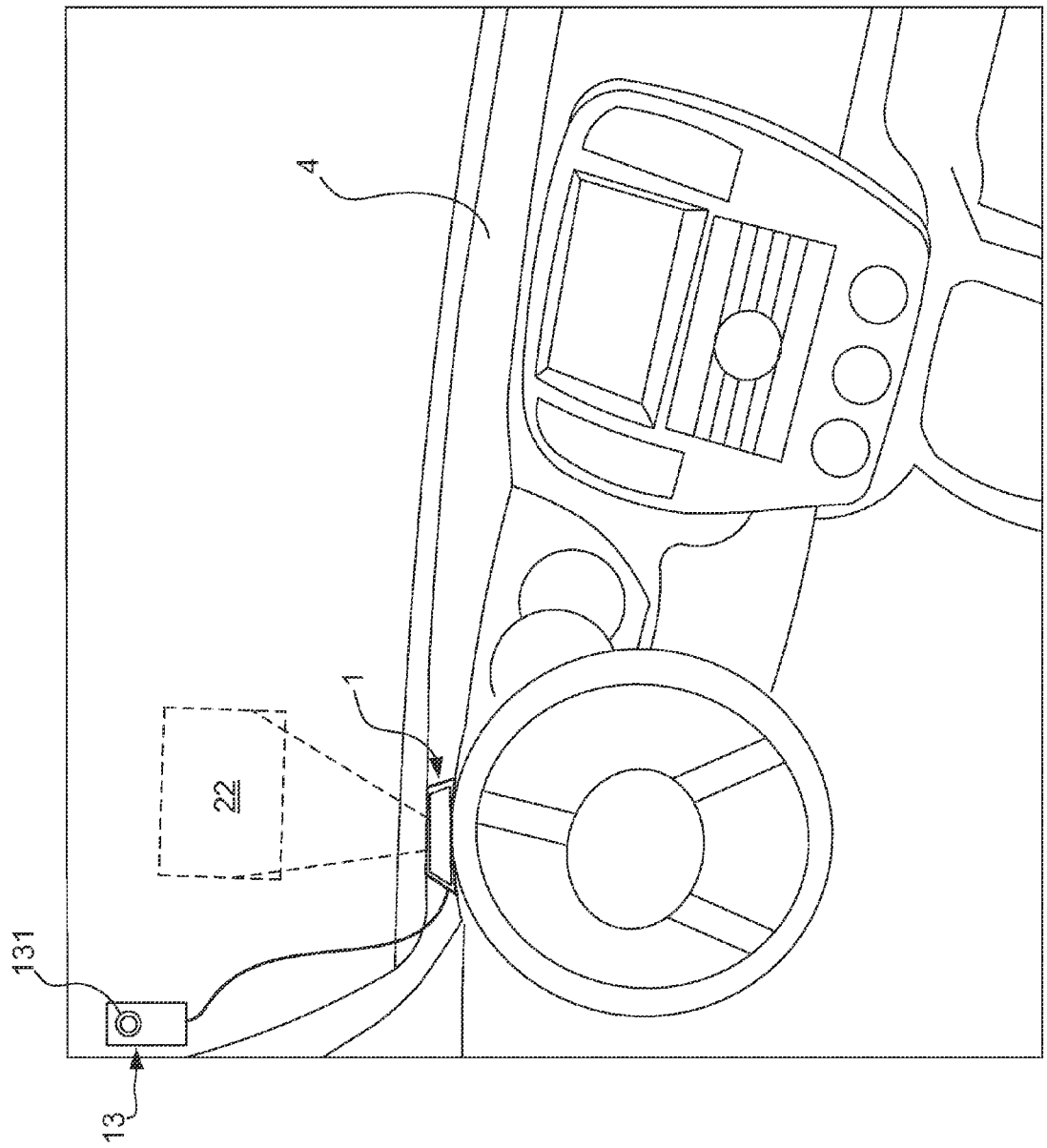
FIG. 8 is a schematic operation diagram of the head-up device.

Moreover, it is able to expand extra functions to the head-up device 1 of the present invention by way of connecting different electronic devices. Please refer to FIG. 8, which illustrates a schematic operation view of the head-up device. As shown in FIG. 8, an automatic adjustment module 13 having an eye catching unit 131 and an automatic adjustment circuit unit (not shown) is connected to the head-up device 1. The eye catching unit 131 is configured for catching the position of eyeballs of the driver, and the automatic adjustment circuit unit coupling to the eye catching unit 131 is used for automatically adjusting the projection position of the image to be displayed according to the position of the eyeballs.

Thus, through above descriptions, the framework and related constituting elements of the head-up device 1 integrated with the sectional dynamic-driving backlight module 11 of the present invention have been introduced completely and clearly; in summary, the head-up device 1 of the present invention includes the advantages of:

1. Comparing to the conventional backlight display module introduced in above-mentioned Description of the Prior Art, the sectional dynamic-driving backlight module 11 of the head-up device 1 is able to provide a uniform backlight to a LCD because of having a directional lens unit 113 for converging the divergence angle of the light emitted from the light source sets 112 and a light homogenizing unit for homogenizing the light directed and concentrated by the directional lens unit 113, so as to facilitate the brightness of all display regions on the display be uniform; therefore, the driver can see the images or texts shown on the display region of the display easily and clearly.

2. Moreover, differing from the conventional backlight display module, each of the light source sets 112 applied in the sectional dynamic-driving backlight module 11 of the head-up device 1 have a red-light LED chip 112R, a green-light LED chip 112G, a blue-light LED chip 112B, and a white-light LED chip 112W; thus, when the image to be displayed is showed on the display unit 115, the controlling board 111 would control the light source sets 112 according to the colors of different sections of the image to be displayed, therefore the light source sets 112 make the red-light LED chip 112R, the green-light LED chip 112G, the blue-light LED chip 112B, or the white-light LED chip 112W emit light correspondent with the controlling from the controlling board 111, so as to achieve a sectional dynamic display and make the head-up device 1 be energy-saving.

3. Inheriting to above point 2, the sectional dynamic display of the head-up device 1 can further be divided into a daytime display mode and a night display mode. When the daytime display mode is executed, the controlling board 111 controls the light source sets 112 to emit light by high brightness; on the contrary, When the night display mode is executed, the controlling board 111 controls the light source sets 112 to emit light by low brightness; therefore, the head-up device 1 becomes more energy-saving through the sectional dynamic display of the daytime display mode and night display mode.

4. Differing from the conventional backlight display module, an external electronic device 3 can be connected to the head-up device 1 of the present invention, and then the electronic device 3 is able to input a display signal to the head-up device; therefore the related image of the display signal would be projected to the eyebox 22 of the driver.

5. Moreover, in some exemplary embodiment of the head-up device 1, a full-color image can be displayed a full-color display region; meanwhile, the controlling board 111 controls the light source set 112 of the full-color display region for making the red-light LED chip 112R, the green-light LED chip 112G, the blue-light LED chip 112B, and the white-light LED chip 112W continuously emit light by a time sequential way. Therefore, the full-color image can be displayed without using any color filters.

6. Furthermore, an automatic adjustment module 13 having an eye catching unit 131 and an automatic adjustment circuit unit can be connected to the head-up device 1 of the present invention for function-expanding purpose. Wherein the eye catching unit 131 is configured for catching the position of eyeballs of the driver, and the automatic adjustment circuit unit coupling to the eye catching unit 131 is used for automatically adjusting the projection position of the image to be displayed according to the position of the eyeballs.

The above description is made on embodiments of the present invention. However, the embodiments are not intended to limit scope of the present invention, and all equivalent implementations or alterations within the spirit of the present invention still fall within the scope of the present invention.

What is claimed is:

1. A sectional dynamic-driving backlight module, comprising:
a controlling board;
a plurality of light source sets, being disposed on the controlling board, wherein each of the light source sets have a red-light LED chip, a green-light LED chip, a blue-light LED chip, and a white-light LED chip;
a directional lens unit, being disposed over the light source sets and comprising:
a first substrate;
a first period-variable and curvature-variable lens array, being formed on one surface of the first substrate, used for deflecting the light emitted by the light source sets, so as to converge a divergence angle of the emitted light; and
a second period-variable and curvature-variable lens array, being formed on the other surface of the first substrate opposite to the first period-variable and curvature-variable lens array, used for further directing and focusing the light deflected by the first period-variable and curvature-variable lens array, such that the light deflected by the directional lens unit would be directed and concentrated within an eyebox of a driver;
a light homogenizing unit, being disposed over the directional lens unit, used for homogenizing the light directed and concentrated by the directional lens unit; and
a display unit for showing an image to be displayed;
wherein when the image to be displayed is showed on the display unit, the controlling board would control the light source sets according to the colors of different sections of the image to be displayed, therefore the light source sets make the red-light LED chip, the green-light LED chip, the blue-light LED chip, or the white-light LED chip emit light correspondent with the controlling from the controlling board.

2. The sectional dynamic-driving backlight module of claim 1, wherein the light homogenizing unit comprises:
a second substrate;
a first cylindrical lens array, being formed on one surface of the second substrate; and
a second cylindrical lens array, being formed on the other surface of the second substrate opposite to the first cylindrical lens array, wherein the second cylindrical lens array is orthogonal to the first cylindrical lens array.

3. The sectional dynamic-driving backlight module of claim 1, wherein the light homogenizing unit comprises:
a second substrate; and
a fly lens array, being formed on one surface of the second substrate.

4. The sectional dynamic-driving backlight module of claim 1, wherein the display unit is selected from the group consisting of: liquid crystal display (LCD) and any one non-self-emitting luminescence display.

5. The sectional dynamic-driving backlight module of claim 1, wherein the light homogenizing unit comprises:
a first period-variable and curvature-variable cylindrical lens array, being formed on one surface of the second substrate; and
a second period-variable and curvature-variable cylindrical lens array, being formed on the other surface of the first substrate opposite to the first period-variable and curvature-variable cylindrical lens array, wherein the second period-variable and curvature-variable cylindrical lens array is orthogonal to the first period-variable and curvature-variable cylindrical lens array.

6. A head-up display device, comprising:
a housing, at least having a display opening; and
a sectional dynamic-driving backlight module, being disposed in the housing and comprising:
a controlling board;
a plurality of light source sets, being disposed on the controlling board, wherein each of the light source sets have a red-light LED chip, a green-light LED chip, a blue-light LED chip, and a white-light LED chip;
a directional lens unit, being disposed over the light source sets and comprising: a first substrate, a first period-variable and curvature-variable lens array formed on one surface of the first substrate and a second period-variable and curvature-variable lens array formed on the other surface of the first substrate opposite to the first period-variable and curvature-variable lens array; wherein the first period-variable and curvature-variable lens array is used for deflecting the light emitted by the light source sets, so as to converge a divergence angle of the emitted light, and the second period-variable and curvature-variable lens array being used for further directing and focusing the light deflected by the first period-variable and curvature-variable lens array, such that the light deflected by the directional lens unit would be directed and concentrated within an eyebox of a driver;
a light homogenizing unit, being disposed over the directional lens unit, used for homogenizing the light directed and concentrated by the directional lens unit; and
a display unit for showing an image to be displayed;
wherein when the image to be displayed is showed on the display unit, the controlling board controlling the light source sets according to colors of different sections of the image to be displayed, therefore the light source sets would make the red-light LED chip, the green-light LED chip, the blue-light LED chip, or the white-light LED chip emit light by the controlling from the controlling board.

7. The head-up display device of claim 6, wherein the light homogenizing unit comprises:
a second substrate;
a first cylindrical lens array, being formed on one surface of the second substrate; and
a second cylindrical lens array, being formed on the other surface of the second substrate opposite to the first cylindrical lens array, wherein the second cylindrical lens array is orthogonal to the first cylindrical lens array.

8. The head-up display device of claim 7, wherein the light homogenizing unit comprises:
a second substrate; and
a fly lens array, being formed on one surface of the second substrate.

9. The head-up display device of claim 6, wherein the display unit is selected from the group consisting of: liquid crystal display (LCD) and any one non-self-emitting luminescence display.

10. The head-up display device of claim 6, wherein the light homogenizing unit comprises:
- a second substrate;
- a first period-variable and curvature-variable cylindrical lens array, being formed on one surface of the second substrate; and
- a second period-variable and curvature-variable cylindrical lens array, being formed on the other surface of the first substrate opposite to the first period-variable and curvature-variable cylindrical lens array, wherein the second period-variable and curvature-variable cylindrical lens array is orthogonal to the first second period-variable and curvature-variable cylindrical lens array.

11. The head-up display device of claim 6, further comprising an automatic adjustment module having:
- an eye catching unit for catching the position of eyeballs of the driver; and
- an automatic adjustment circuit unit, being coupling to the eye catching unit, used for automatically adjusting the projection position of the image to be displayed according to the position of the eyeballs.

* * * * *